Aug. 11, 1942.　　　　N. E. WALKER　　　　2,292,416
CONTROLLED CAPTIVE TYPE TOY AIRPLANE
Filed Dec. 26, 1940　　　2 Sheets-Sheet 1

INVENTOR
Nevilles E. Walker
BY
ATTORNEY

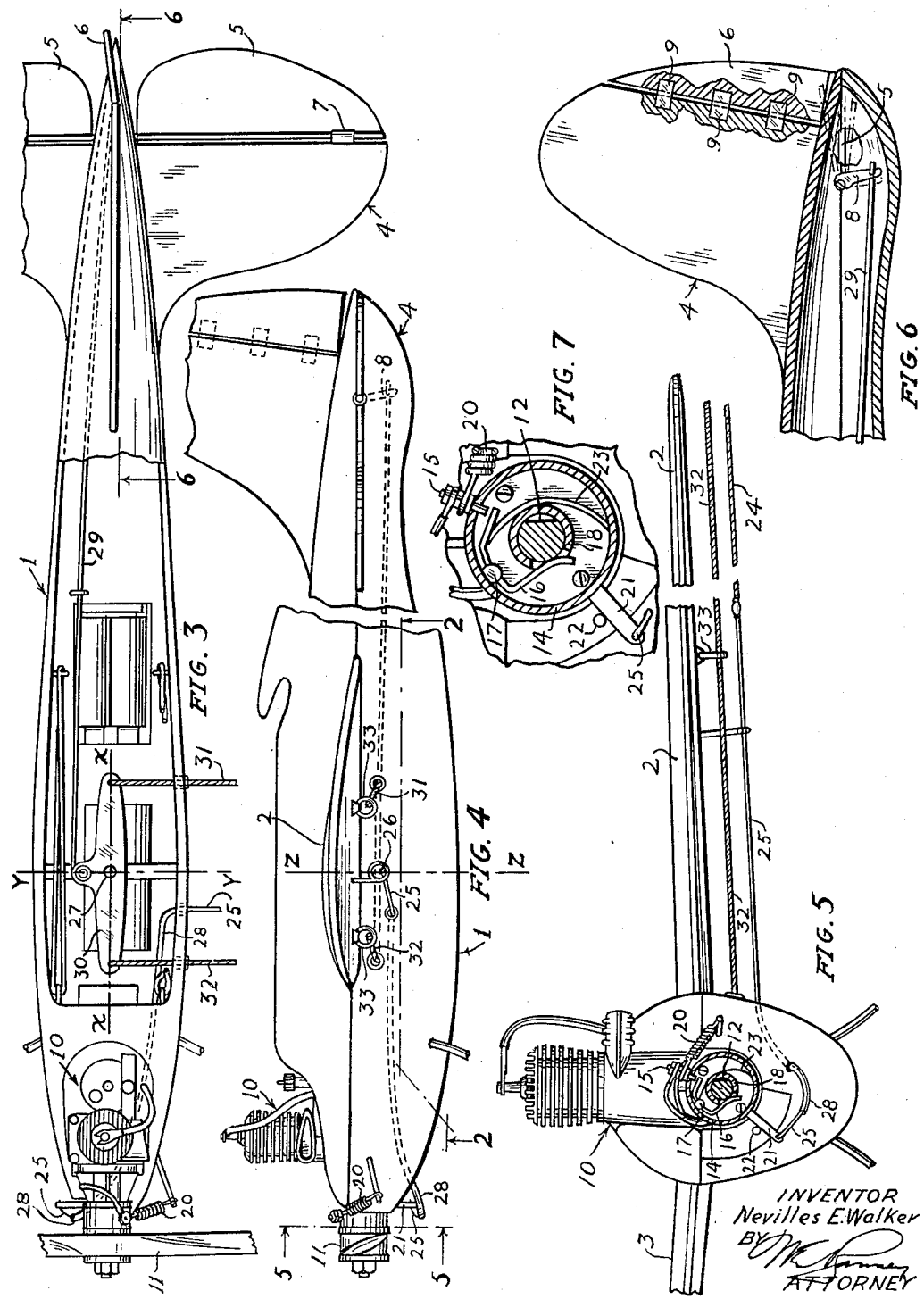

Patented Aug. 11, 1942

2,292,416

UNITED STATES PATENT OFFICE 2,292,416

CONTROLLED CAPTIVE TYPE TOY AIRPLANE

Nevilles E. Walker, Portland, Oreg.

Application December 26, 1940, Serial No. 371,621

14 Claims. (Cl. 46—78)

My invention relates to toy airplanes of the so-called captive type, and it relates more particularly to power propelled captive toy airplanes.

Because of the difficulty in recovering power propelled toy airplanes after a flight, and also because the airplane frequently struck buildings, trees, or other objects during the flight, it has heretofore been attempted to limit the flight of the airplane by attaching it to one end of a string, the other end of which is retained in the hand of the operator. This expedient has not been generally successful, however, because it has not been possible to control the airplane by means of a string; its flight has merely been limited to a circular path.

With a captive type airplane flying in a circular path at the end of a string, it is desirable to be able to control the height of the plane for the purpose of flying an airplane in the wind, for avoiding obstacles, as well as for amusement. This may be done by controlling the position of those portions of the tail structure of the airplane commonly called elevators. However, I have found that moving the elevators of a captive airplane to cause it to rise will not by itself produce the desired result because, as the airplane rises, it loses velocity and the centrifugal force which had theretofore held the control strings taut and at some part it diminishes sufficiently to allow these strings to slacken. Said airplane as it climbs describes a circle of smaller diameter, and as the string extends progressively upwards its tautness is diminished. Then if the operator cannot readily control the elevators with slackened strings, the airplane dives and crashes.

To prevent slackening of the control string, it is desirable that the airplane be caused to yaw outwardly whenever the elevators are moved to cause the airplane to rise. Furthermore, this outward yawing is desirable to prevent the airplane making an inward (and downward) dive when it has ascended sufficiently so that it travels in a small circle, the control string then being directed upwardly at a considerable angle.

This tendency to dive inward, that is, toward the operator, is due to two factors: First, because it is desirable for an airplane of this type to glide effectively with the power shut off, its wings are tilted so that it tends to rise sharply when flying under power, this tendency normally being counteracted by the elevators. Second, when the captive airplane is flying at a high elevation and in a small circle, it should be banked so that the aforesaid tilt of the wings tends to cause it to be directed inwardly, instead of upwardly.

Thus, when the airplane is at a rather high level and its elevators are moved to cause it to rise still higher, it may suddenly dive toward the operator because of the tilt of the wings. To prevent this inward diving, it is desirable that the airplane be caused to yaw outwardly when its elevators are moved. On the other hand, the opposite result is desirable when the elevators are moved to cause the airplane to descend. It is then desirable that the airplane yaw inwardly because the increased speed in descending increases the centrifugal force, tending to produce an undue tension in the control string.

In order that the airplane shall fly efficiently in a circular path, it should be banked properly, although it is not necessary to bank a captive airplane as much as a free airplane. Because a captive airplane must fly in a smaller circle as it rises, it should be banked correspondingly more as it rises.

One of the principal objects of my invention is to provide control strings for a captive type toy airplane whereby the airplane will be caused to yaw outwardly or inwardly as the elevators are moved to cause the airplane to ascend or descend, respectively, and whereby the airplane will be caused to roll to bank it properly for different heights. I achieve said object by providing a pair of strings attached to the ends of a centrally pivoted lever the pivot of which is located substantially at the longitudinal center of mass of the airplane, the lever being operatively connected to the elevators by suitable means. Then, with this lever in its normal position arranged lengthwise of the body of the airplane, when the operator pulls on the rearmost string to move the elevators to cause the airplane to rise, the force exerted by the string will be applied to the airplane somewhat behind its center of mass, and the airplane will thus be caused to yaw outward. On the other hand, when the operator pulls on the forward string to move the elevators to cause the airplane to descend, force will be applied to the airplane, forward of its center of mass and it will tend to yaw inward.

To assure proper banking and to secure lateral stability of the airplane, the aforesaid strings are passed along the under side of one wing, passing thru rings attached to the wing and thus maintaining the wing substantially parallel to the strings. Thus, when the airplane is near the ground and the strings are substantially horizontal, it will be banked only to the extent of its dihedral, whereas when the airplane has ascended so that the strings slope upward it will be banked because of the slope of the strings in addition to its dihedral.

A further object of my invention is to provide a string for controlling the speed of a captive toy airplane. These airplanes are commonly provided with miniature two-cycle gasoline engines whose speed may readily be controlled by rotating the timer shell. To assure smooth speed control it is desirable to provide a spring for rotating the timer shell to increase the speed of the engine, and to oppose this spring by the string to be pulled to decrease the speed of the engine. This seemingly simple expedient is really a matter of difficulty because an adequate pull cannot be exerted directly on the timer else the airplane will be caused to yaw inwardly.

I obviate this difficulty by leading the string into the airplane so that its direction, and hence the force exerted by it, is toward the longitudinal center of mass of the airplane. Pulling on the string will thus not cause yawing of the airplane. I also arrange this timer string thru a ring attached to the under side of one wing, as described hereinbefore with reference to the control strings. Tension of the timer string thus tends to prevent rolling of the airplane, and to bank it properly.

A further object of my invention is to provide a timer string leading into the airplane toward the longitudinal center of mass thereof that will operate smoothly to control the speed of a gasoline engine located forwardly of said center of mass. I achieve said object by providing a curved tube for guiding the timer string thru the body of the airplane, and by making the end portion of said timer string of the material commonly used for fishing leaders and known as catgut. This material has ample strength, and I have found that it will slide freely thru the curved tube and ring for a satisfactorily long time whereas any other material with which I am familiar either will not slide freely or it will wear rapidly.

A further object of my invention is to provide cheap and simple means for adjustably mounting the rudder of a toy airplane. Aside from the means for causing the airplane to yaw outwardly when it is caused to ascend, hereinbefore mentioned, it is usually desirable to give the airplane a steady tendency to yaw outwardly by appropriately positioning the rudder. The air drag on the strings necessarily causes the airplane to be pulled toward the operator, and the pull is roughly proportional to the length of the strings. The movement of the airplane bodily toward the operator due to the necessary pulling on the control strings is thus offset. But it is necessary that the rudder be adjustable since in some cases it must be turned to a much greater angle. For example, if the airplane is controlled by a rather short string and the operator remains stationary so that it flies in a rather small circular path, centrifugal force may serve to hold the airplane away from the operator with the rudder nearly parallel to the path of the airplane. On the other hand, if the operator should ride along on a moving vehicle, centrifugal force might be entirely absent or it might tend to throw the airplane toward the operator, in which case the rudder would have to be set at a considerable angle to keep the airplane away from the operator thus keeping the control strings taut. I achieve this object in a cheap and wholly satisfactory manner by the means hereinafter described.

Other objects of my invention will be discussed with reference to the accompanying drawings, in which:

Fig. 3 is a fragmentary plan view of the airplane shown in Fig. 1, portions thereof being shown broken away;

Fig. 4 is a foreshortened fragmentary side elevation of the airplane shown in Fig. 1;

Fig. 5 is a foreshortened vertical sectional view taken along the line 5—5 in Fig. 4;

Fig. 6 is a fragmentary sectional view taken on the line 6—6 in Fig. 3; and

Fig. 7 is a larger sealed detail taken on the line 5—5 in Fig. 4.

Figure 1:
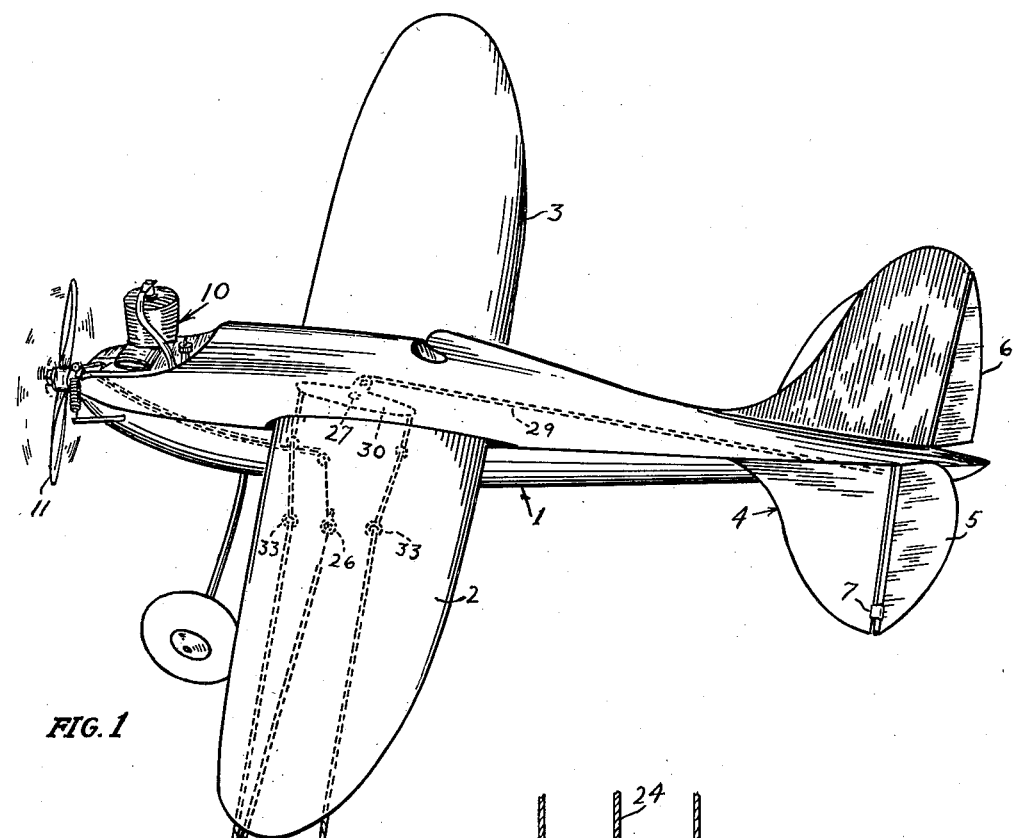
Fig. 1 is a foreshortened perspective view of a power driven, string controlled toy airplane embodying my invention.
Figure 2:
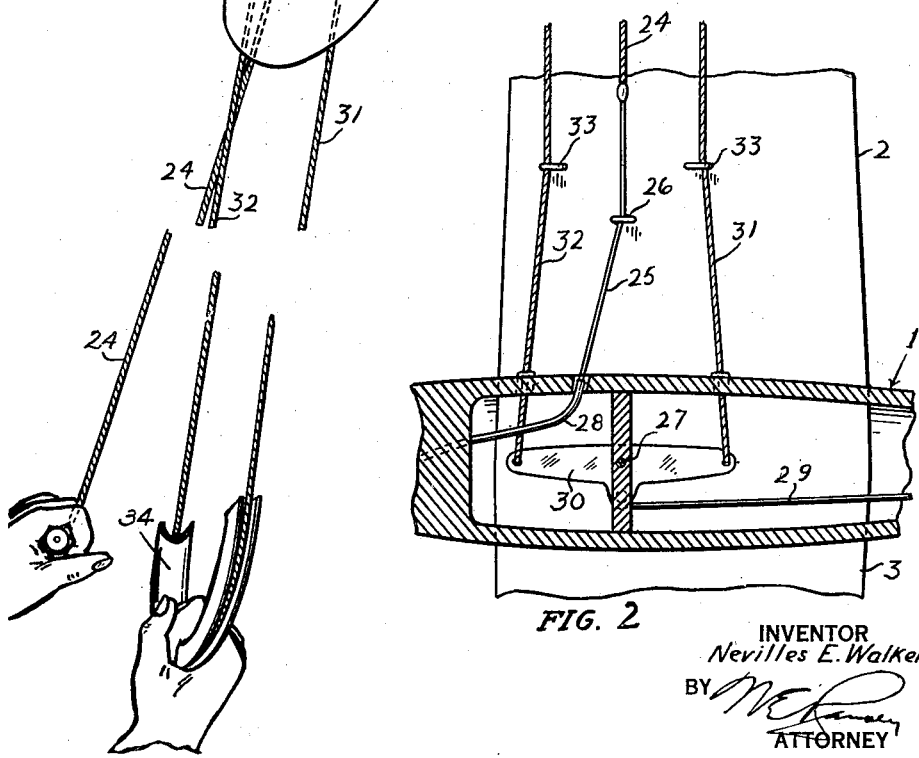
Fig. 2 is an enlarged fragmentary bottom view of a portion of the structure shown in Fig. 1.

A toy airplane embodying my invention comprises a body 1 having wings 2 and 3 and a tail 4. Elevators 5 are pivotally secured to tail 4 by hinges 7, and the position of said elevators may be controlled by lever 8 which is affixed to both elevators. Rudder 6 is secured to tail 4 by metal tabs 9 embedded in both the tail and the rudder. I prefer to make said tabs of a material such as aluminum which may be bent to place the rudder at the proper angle, and which will thereafter maintain the rudder in this position. I find this to be a cheap and satisfactory means for providing an adjustable rudder for a toy airplane.

An engine 10 of the two-cycle gasoline type is mounted in the forward portion of body 1 and is directly connected to propeller 11. Ignition for said engine is controlled by a timer comprising a cam 12 carried by the crank shaft of engine 10, and timer shell 14 having an insulated terminal 15 and rocker arm 16 pivotally mounted on pin 17 which is fixedly mounted in timer shell 14. Thus, when the flat portion of cam 12 engages rocker arm 16 the latter will make contact with terminal 15 causing ignition of the charge of air-fuel mixture in engine 10 by any well known ignition means. Engine 10, including the timer, may be of any suitable well known form. However, the means for controlling the timer is new and forms an important part of my invention.

It will be understood that the timing of engine 10 will be controlled by the rotation of timer shell 14, this being the means ordinarily used for controlling the speed of two-cycle engines. A stationary sleeve 18 is provided with a notch in which rocker arm 16 operates. When shell 14 is allowed to be rotated by spring 20 until arm 21 affixed to said shell is stopped by pin 22, the engine will operate at maximum speed, its spark being fully advanced. On the other hand, when the timer shell is rotated against the tension of spring 20, the speed of the engine will be reduced, and finally, if said shell is rotated far enough so that rocker arm 16 leaves the notch and rides on the surface of sleeve 18, the engine will be stopped because rocker arm 16 will be held away from terminal 15 thus breaking the ignition circuit of the engine. Leaf spring 23 holds rocker arm 16 in the notch in sleeve 18 and against cam 12 unless timer shell 14 is rotated sufficiently against the tension of spring 20, which should be insulated from terminal 15.

Having described a spring controlled timer for regulating the speed of a toy airplane engine, the timer being adapted to stop the engine when its shell is rotated sufficiently against the tension of a spring, I will now describe the means which I prefer for rotating said timer shell to control the speed of the engine as desired. The operator will normally be a considerable distance from the airplane, say 50 feet. A string 24 of suitable length is tied to leader 25 which may be of the type commonly used for fishing. Leader 25 is passed thru ring 26 attached to the under side of wing 2 and positioned so that string 24 points toward the longitudinal center of mass of the airplane, which is substantially at pin 27. Thus the force exerted by said string is always toward the center of mass and does not tend to cause the airplane to yaw. However, this force will, of course, tend to move the airplane bodily and hence it must not be too great. In other words, spring 20 must not be too stiff, and the connection from arm 21 to the string at ring 26 must not bind.

I have found that, by placing a curved tube 28 in body 1 to serve as a guide, leader 25 will slide easily therethru and the timer can thus be controlled effectively without exerting too much force on the airplane. Tube 28 may be made of any suitable material such, for example, as the small copper tubing commonly known as hollow wire.

I shall now describe means for operating the elevators of a toy airplane. As mentioned, lever 8 is fixedly secure to both elevators 5 so that, to cause the airplane to ascend, it is only necessary to rotate said lever 8 counterclockwise as viewed in Fig. 6, whereas rotating the lever clockwise will cause the airplane to descend. Rod 29 pivotally connected to lever 8 and to the T-shaped operating lever 30 serves to move lever 8 for this purpose. Attached to the rearmost end of lever 30 is what I call the elevator string 31. When this string is pulled, as by the hand of the operator (Fig. 11), lever 8 will be moved counterclockwise and elevators 5 will be raised to cause the airplane to rise.

Lever 30 is pivoted on pin 27 which is substantially at the center of mass of the airplane. Inasmuch as string 31 is rearward of this center of mass, pulling on it will cause the airplane to yaw away from the operator. On the other hand, what I call the depressor string 32 is attached to the forward end of lever 30, forward of the center of mass so that pulling on it will cause the airplane to yaw about a vertical axis z—z toward the operator.

So far as I am aware, no practical devices have been provided to control the rolling of a captive type toy airplane, that is, to vary its angular position about the longitudinal axis x—x of the body under definite control. This has not been satisfactory because under many conditions the airplane has not been properly banked for the curvature of its path of flight. I have found that proper banking can be secured by passing strings 31 and 32 thru rings 33 which serve to space the strings slightly from the airplane at a point on the under side of the wing at a substantial distance from the body of the airplane. I then pass said strings into the body at such a height that the strings remain substantially parallel to the lower surface of the wing, thus causing the airplane to be banked slightly when the strings are horizontal and to be banked progressively more as the ariplane ascends. Similarly string 24 is arranged parallel to the lower surface of wing 2 so that pulling on string 24 will aid in properly banking the airplane.

I have hereinbefore described means for causing a toy airplane steadily to yaw outward, said means comprising an adjustable rudder. I have also described means for causing the airplane to yaw outward when it is caused to ascend. I prefer also to cause the ariplane to yaw outward, when it is caused to ascend, to an extent that increases with the speed of the engine since the inward diving that I wish to avoid takes place much more rapidly at high engine speeds than at low speeds. I achieve this result by causing the engine of my airplane to rotate in such a direction that the gyroscopic couple produced when the front end of the airplane rises is in the direction to cause outward yawing of the airplane. This requires that the engine of my airplane shall rotate in a direction opposite to that which has become standard for automobiles and airplanes. In other words, I cause my engine to rotate in a counterclockwise direction as viewed from the front, and I attach my control strings to the left hand wing of the airplane so that the airplane crosses from right to left in front of the operator. Of course, the desired result as to yawing could be achieved by an engine rotating in the conventional direction if the ariplane travelled from left to right in front of the operator, but the latter direction is objectionable to most people.

The operator of a toy airplane embodying my invention may start the engine and cause it to run slowly by pulling on the timer string until he is ready for the flight to start. Then, releasing the timer string will permit the engine to gain speed until the airplane takes off and flies. The airplane may be caused to fly in a circular path, if the operator remains stationary, by holding the elevator and depressor strings taut. Said strings may, for convenience, terminate in a hand grip 34, if desired. When it is desired to cause the airplane to climb or descend, it is only necessary to pull on the elevator or depressor strings. In order that the required pull shall not be too great, thereby moving the airplane bodily, lever 30 should be of considerable length. Lengthening lever 30 also increases the distance from the longitudinal center of mass to the point where the pull is applied. Thus, although less force is exerted by the string in causing the airplane to ascend, the tendency to yaw will be unchanged when lever 30 is lengthened. On the other hand, if the tendency to yaw when the elevator or depressor strings are pulled is too great, lever 8 may be lengthened or guides 33 may be spaced a lesser distance apart thus correspondingly reducing the resultant tendency to yaw.

I have found that, by following the principles herein expounded, I can build a toy airplane that can be controlled extremely accurately. Furthermore, with reasonable care in its operation, there is little danger of its destruction thru loss of control. For example, I can cause a captive type toy airplane to fly in a vertical loop and then resume its flight, a feat hitherto unperformed as far as I am aware, although it has been attempted many times.

I prefer hand grip or spreader 34 to be U-shaped, and I find it advantageous to hold said grip vertically, as shown in Fig. 1. The reason for this position of the hand grip or spreader will be understood if it be assumed that, with the airplane flying steadily, the hand grip or spreader be held perfectly still, as if strings 31 were tied to a stake somewhat above string 32. Then, when the airplane tends to descend for any reason, the tension of string 31 will be increased thus causing the airplane to tend to ascend. When the airplane climbs the tension of string 32 will be increased thus causing the airplane to descend. In this way, the tendency of the airplane to either climb or descend is opposed, and the stability of the airplane is increased. I find that even a comparatively slight spacing of strings 31 and 32 at the hand grip or spreader 34 increases the stability of the airplane to a worthwhile extent.

I claim:

1. A captive type power driven toy airplane comprising a body and two wings, an engine and a timer therefor, said timer comprising a rotatable shell and a spring for rotating said shell in one direction, a timer string for rotating said shell in the opposite direction, a ring attached to one of said wings at a point substantially opposite the center of mass of said airplane, a curved tube carried by said body, one end of said tube being directed toward said timer and the other end thereof being directed toward said ring, said timer string passing thru said tube and said ring.

2. A captive type toy airplane comprising a body and two wings forming a dihedral angle, an elevator string, a depressor string, and a ring attached to one of said wings, said ring being spaced from said body, one of said strings passing thru said ring.

3. A captive type toy airplane comprising a body and two wings forming a dihedral angle, an elevator string, a depressor string, and rings attached to one of said wings, said rings being spaced from said body, said strings passing thru said rings.

4. In a captive self-propelled miniature airplane having a fuselage and lateral wings, adjustable elevators and an elevator control therefor, a flexible control line defining the radius of flight of said airplane operatively joined to said elevator control, and a guide secured to said airplane fixed at a point spaced laterally from said fuselage a substantial distance, said control line being threaded thru said guide thereby to induce lateral flying stability in said airplane.

5. In a captive self-propelled miniature airplane having a fuselage and lateral wings, adjustable elevators and an elevator control therefor, a pair of flexible control lines defining the radius of flight of said airplane operatively joined to said elevator control to actuate the elevators upwardly and downwardly, respectively, and a pair of spaced guides secured to said airplane each fixed at a point spaced laterally from said fuselage a substantial distance, said pair of control lines being threaded thru said guides, respectively, thereby to induce lateral flying stability in said airplane.

6. In a captive self-propelled miniature airplane having a fuselage and lateral wings, adjustable elevators and an elevator control therefor, a pair of flexible control lines defining the radius of flight of said airplane operatively joined to said elevator control to actuate the elevators upwardly and downwardly, respectively, and a pair of spaced guides secured to said airplane each fixed at a point spaced laterally from said fuselage a substantial distance, said pair of control lines being threaded thru said guides, respectively, thereby to induce lateral flying stability in said airplane, said guides being spaced apart a substantial distance and lying at opposite sides of a line passing laterally thru the center of mass of said airplane.

7. In a captive self-propelled miniature airplane having a fuselage and lateral wings, adjustable elevators and an elevator control therefor, a pair of flexible control lines defining the radius of flight of said airplane operatively joined to said elevator control to actuate the elevators upwardly and downwardly, respectively, and a pair of spaced guides secured to said airplane each fixed at a point spaced laterally from said fuselage a substantial distance, said pair of control lines being threaded thru said guides, respectively, thereby to induce lateral flying stability in said airplane, said guides being spaced apart a substantial distance and lying at opposite sides of a line passing laterally thru the center of mass of said airplane, said guides being secured to one of said lateral wings.

8. In a captive self-propelled miniature airplane having a fuselage and lateral wings, adjustable elevators and an elevator control therefor, said control including a lever pivotally mounted intermediate its ends at substantially the center of mass of said airplane, said lever being operatively connected to the elevators so that movement of said lever in one direction about its pivotal mounting will tilt the elevators upwardly and in the other direction will tilt them downwardly, a pair of flexible control lines defining the radius of flight of said airplane, secured respectively to the opposite ends of said lever, and a pair of spaced guides fixed to said airplane at points spaced laterally from said fuselage a substantial distance, said control lines being threaded thru said guides thereby to induce lateral flying stability in said airplane.

9. In a captive self-propelled miniature airplane having a fuselage and lateral wings, adjustable elevators and an elevator control therefor, said control including a lever pivotally mounted intermediate its ends at substantially the center of mass of said airplane, said lever being operatively connected to the elevators so that movement of said lever in one direction about its pivotal mounting will tilt the elevators upwardly and in the other direction will tilt them downwardly, a pair of flexible control lines defining the radius of flight of said airplane, secured respectively to the opposite ends of said lever, and a pair of spaced guides fixed to said airplane at points spaced laterally from said fuselage a substantial distance, said control lines being threaded thru said guides thereby to induce lateral flying stability in said airplane, the guide for the control line for lowering said elevators being arranged forward of the center of mass of said airplane and the guide for the control lines for lifting said elevators being arranged aft of said center of mass.

10. In a captive self-propelled miniature airplane having a fuselage and lateral wings, a guide line attached to said airplane to limit the flight thereof to a circular course, a rudder for said airplane set to a predetermined position forming an oblique angle to the fuselage to tend to cause said airplane to fly nose outwardly along said circular course to maintain tension in said guide line.

11. In a captive self-propelled miniature airplane having a fuselage and lateral wings, a guide line attached to said airplane to limit the flight thereof to a circular course, an adjustable rudder for said airplane adapted to be set and held to a predetermined position forming an oblique angle to the fuselage to tend to cause said airplane to fly nose outwardly along said circular course to maintain tension in said guide line.

12. In a captive self-propelled miniature airplane having a fuselage and lateral wings, control lines secured at one end to said airplane constituting the connection to define the path traversed by said airplane, one of said lines being an elevator line and another a depressor line, and a pair of guides spaced apart longitudinally of said airplane and fixed laterally of the center of mass of said airplane, the elevator line passing thru a guide arranged rearwardly of the center of mass and the depressor line extending thru a guide arranged forwardly of said center of mass.

13. In a captive self-propelled miniature airplane having a fuselage and lateral wings, diverging control lines secured at one end to said airplane constituting the connection to define the path traversed by said airplane, one of said lines being an elevator line and another a depressor line, and a spreader providing a substantial vertical span secured directly to the other ends of said elevator and depressor lines with the elevator line secured to the upper portion of said spreader and the depressor line secured to the lower portion of said spreader, whereby lessening elevation tenses the elevator line and increasing elevation tenses the depressor line, thus to tend to maintain uniform elevation in said airplane flight.

14. A captive type power driven toy airplane comprising a body and two wings, an engine and a timer therefor, said timer comprising a rotatable shell and a spring for rotating said shell in one direction, a timer string for rotating said shell in the opposite direction, a ring attached to one of said wings at a point substantially opposite the center of mass of said airplane, a curved tube carried by said body, one end of said tube being directed toward said timer and the other end thereof being directed toward said ring, said timer string passing thru said tube and said ring, the portion of said timer string passing thru said tube comprising a section of fishing leader.

NEVILLES E. WALKER.